July 27, 1954

W. E. KOCK 2,684,724

SOUND WAVE REFRACTOR

Filed Oct. 1, 1948

INVENTOR
W. E. KOCK
BY
Franklin Mohr
ATTORNEY

July 27, 1954

W. E. KOCK 2,684,724

SOUND WAVE REFRACTOR

Filed Oct. 1, 1948

INVENTOR
W. E. KOCK
BY
Franklin Mohr
ATTORNEY

July 27, 1954

W. E. KOCK 2,684,724

SOUND WAVE REFRACTOR

Filed Oct. 1, 1948

INVENTOR
W. E. KOCK
BY
Franklin Mohr
ATTORNEY

July 27, 1954  W. E. KOCK  2,684,724
SOUND WAVE REFRACTOR
Filed Oct. 1, 1948  6 Sheets-Sheet 4

INVENTOR
W. E. KOCK
BY
Franklin Mohr
ATTORNEY

July 27, 1954  W. E. KOCK  2,684,724
SOUND WAVE REFRACTOR

Filed Oct. 1, 1948　　　　　　　　　　　6 Sheets-Sheet 5

INVENTOR
W. E. KOCK
BY
Franklin Mohr
ATTORNEY

July 27, 1954     W. E. KOCK     2,684,724
SOUND WAVE REFRACTOR

Filed Oct. 1, 1948     6 Sheets-Sheet 6

INVENTOR
W. E. KOCK
BY
Franklin Mohr
ATTORNEY

Patented July 27, 1954

2,684,724

UNITED STATES PATENT OFFICE 2,684,724

SOUND WAVE REFRACTOR

Winston E. Kock, Basking Ridge, N. J., assignor to Bell Telephone Laboratories, Incorporated, New York, N. Y., a corporation of New York Application October 1, 1948, Serial No. 52,350

8 Claims. (Cl. 181—.5)

This invention relates to sound, acoustic and other compressional wave refracting devices and particularly to those which comprise a plurality of rigid elements mounted in an array.

In accordance with the invention, sound refracting devices are made up of rigid elements having one or more, or in some cases all, of their dimensions small compared with the wavelength of the sound wave to be refracted and in certain cases spaced apart at intervals which are small compared with the wavelength. Alternatively, the array may be formed of rigid parallel plates set at an angle with respect to the direction of approach of sound waves, whereby the waves are forced to take inclined paths which are longer than the free space paths, thereby introducing phase delay. The arrays are made in the form of lenses, prisms, etc., by substantially filling with such spaced rigid elements a volume of space having the shape of an optical lens, prism or other refracting device.

The invention is described in detail hereinafter in conjunction with the accompanying drawing while the scope of the invention is defined by the appended claims.

In the drawings, Figs. 1, 2 and 3 are diagrams useful in explaining the operation of the invention;

Figure 1:
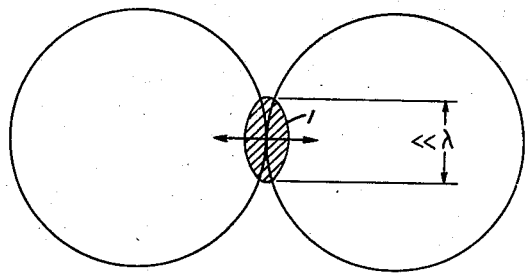
Figure 8:
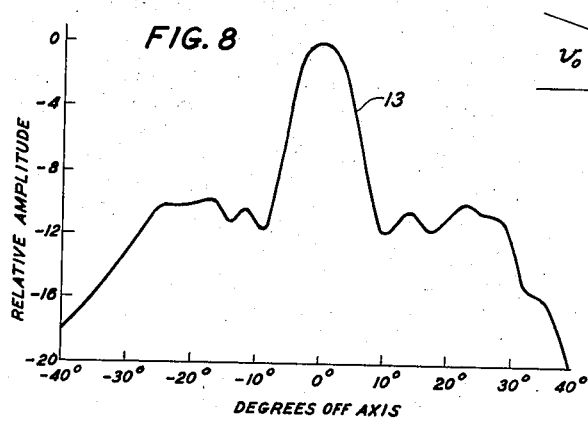
Fig. 8 is a radiation pattern obtained in the testing arrangement of Fig. 7 with a refractor of the type shown in Fig. 6.

Fig. 1 indicates a rigid disc 1 which is arranged to be moved back and forth, as shown by the arrows, in a direction parallel to its axis. By "rigid" here is meant that a body to which the term is applied is substantially invariable in shape, size and position under the application of the forces exerted by the waves to be refracted. If the disc is oscillated at a frequency sufficiently low so that the wavelength of the sound waves in the medium at that frequency is large compared to the size of the disc, a sound pattern resembling a figure 8 will be radiated by the oscillating disc as shown. The pattern is a polar representation of the intensities of sound radiated in each direction.

Figure 2:
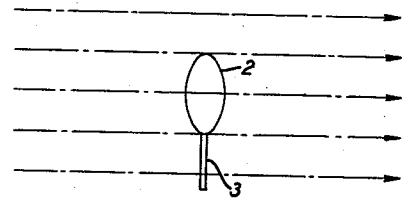

Fig. 2 shows a similar rigid disc 2 rigidly mounted upon a rod 3 and a sound wave, again of relatively low frequency, represented by arrows, is to be regarded as striking the disc. Had the disc been very light and free to move to and fro with the pulsations of the sound wave, it would not have influenced the progress of the sound wave. However, in accordance with the invention, the disc 2 is rigid and is rigidly mounted. Hence the air which normally would pass back and forth through the space bounded by the perimeter of the disc is prevented from so moving and a secondary disturbance is set up.

Figure 3:
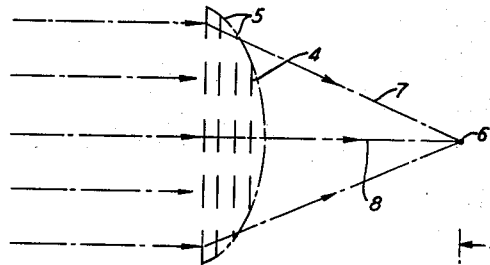
Figure 4:
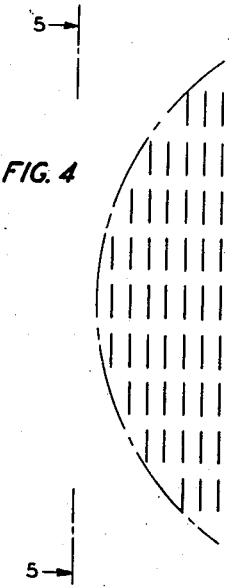
Figs. 4 and 5 are projectional views of an array of rigid elements having the form of a plano-convex sound lens.
Figure 5:
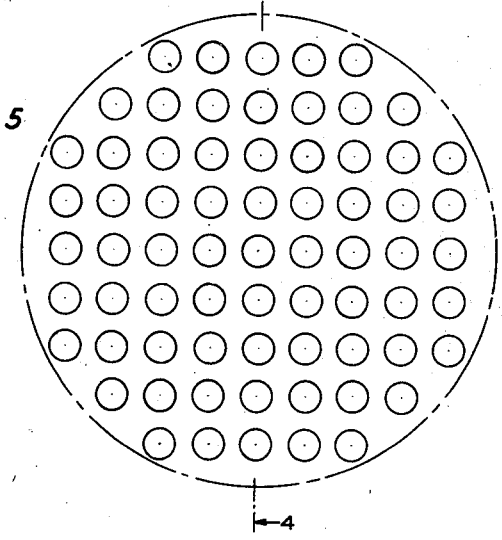
Figure 6:
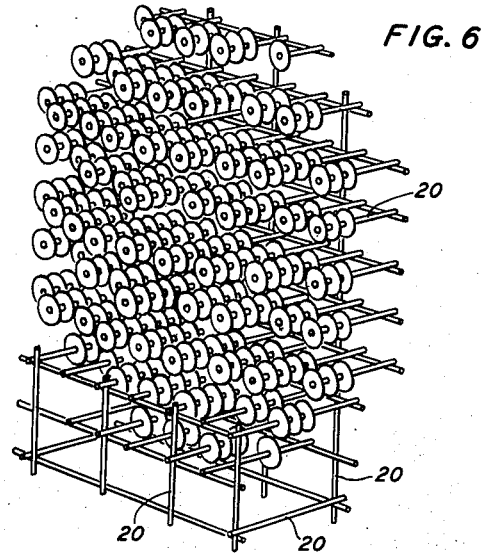
Fig. 6 is a perspective view of a sound lens of the form shown by projections in Figs. 4 and 5.

The final sound field distribution is the sum of the original sound wave plus the secondary wave which latter is equivalent to that radiated from the moving disc of Fig. 1. The phase of this secondary radiation lags the phase of the original wave, for the action of the stationary disc is midway between that of a disc which moves back and forth in synchronism with the sound wave (0 degree lag) and that of a disc which moves back and forth an equal distance, but in opposite phase to the sound wave (180 degrees behind in phase). (See Lamb, Hydrodynamics, p. 521, 1st paragraph. Dover 1945). The sum of two waves of the same frequency, one of which lags the other, is again a wave of the same frequency but retarded in phase. The combined sound field immediately ahead of the disc is therefore delayed in phase relative to the undisturbed field. In Fig. 3, rows of discs 4 are shown and in this case the secondary radiations from all the discs combine to produce a strongly delayed wave as it passes through the array of discs. (Figs. 4, 5 and 6 show views of similar but larger arrays of discs.) The discs in the embodiment shown in Fig. 6 are mounted upon a framework of rigid rods 20. Now a delayed wave is equivalent to a wave encountering a lower propagation velocity as the wave passes through the array. Corresponding to optical terminology, the array possesses an "index of refraction" different from that of the undisturbed medium. Thus if the array is shaped to a convex contour as shown by the contour line 5, waves at the center will be slowed down more than those passing through the thinner, outer sections and ray 8 and ray 7 will consume equal times to converge at the focal point 6 of the array. An acoustic lens is thereby produced. Best efficiency is obtained by having the plane of each disc perpendicular to the axis of the lens.

Figure 7:
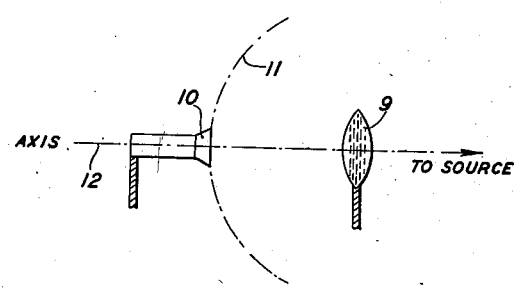
Fig. 7 is a schematic diagram of testing apparatus for obtaining radiation patterns from a sound refractive device.

Fig. 7 shows a testing system as used with an actual sound lens 9, which is illustrated as being of the type shown in perspective in Fig. 6. The sound source is off the diagram at the right, a great distance away, so that substantially plane waves arrive from it at the lens. In this case, the lens, as shown in Fig. 6, is bi-convex, that is, both front and back surfaces are convex as in many optical lenses. Lens 9 then causes the sound to converge at the mouth of a small horn 10 which is coupled to a tube at the left end of which may be placed a microphone. If the horn and lens are rotated in an arc 11 about the lens center, a varying response is obtained as plotted in Fig. 8. Here curve 13 is an experimental plot of response versus degrees off the axis 12 in Fig. 7. A beaming or focussing effect is observed where the horn and lens pass through the axis.

Figure 9:
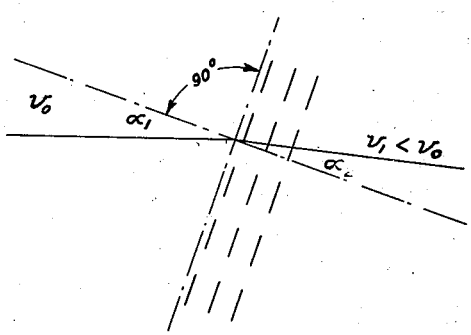
Fig. 9 is a diagram illustrating the refraction of a sound wave by apparatus constructed in accordance with the invention.

Because waves passing through the array of discs are slowed down, they will be "refracted" as in the optical case. Thus in Fig. 9, waves arriving from the left at an angle $\alpha_1$, relative to the perpendicular to the front surface of the array, will, because their velocity $v_1$ inside the array, is less than $v_0$ (their velocity outside), be bent towards the perpendicular. The bending is determined by the well-known optical relation called Snell's law, $$\frac{\sin \alpha_1}{\sin \alpha_2} = \frac{v_0}{v_1} = n$$

where $\alpha_1$ and $\alpha_2$ are the angles indicated in Fig. 9 (the angle of "incidence" and the angle of "refraction" respectively as they are called in optics) and $v_0$ and $v_1$ are the velocities in the medium and in the array, respectively, and $n$ is the index of refraction. When $v_1$ is less than $v_0$, $n$ is greater than unity and the ray is bent towards the normal. When $v_1$ is greater than $v_0$ (as it can be under certain unusual circumstances to be discussed below), the ray is bent away from the normal.

Figure 10:
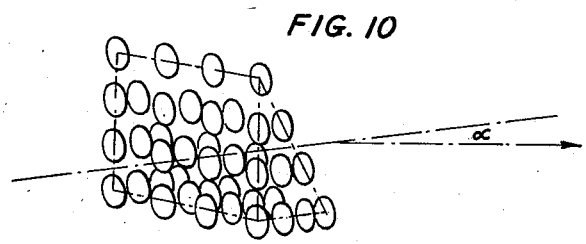
Fig. 10 is a perspective view of an array of rigid elements in the form of a sound prism.

This process of refraction permits the construction of a prism as shown in Fig. 10 and a ray entering as shown from the left will be bent on emerging at an angle $\alpha$, determined by the index of refraction of the array comprising the prism.

Figure 11:
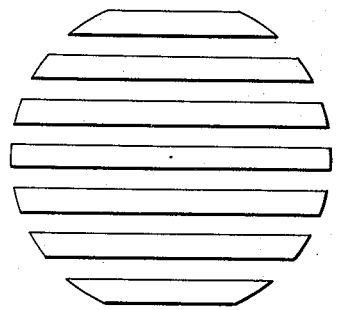
Figs. 11 and 12 are projectional views of an array of elements in the form of long thin strips arranged to produce a plano-convex lens.
Figure 12:
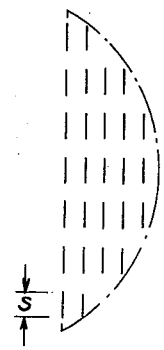
Figure 13:
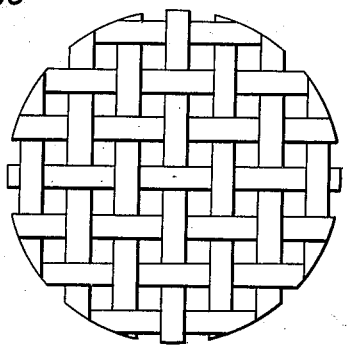
Fig. 13 shows a plan view of interwoven strip elements.
Figure 14:
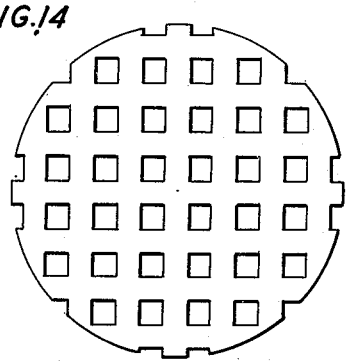
Fig. 14 shows a plan view of a plate element with square holes.
Figure 15:
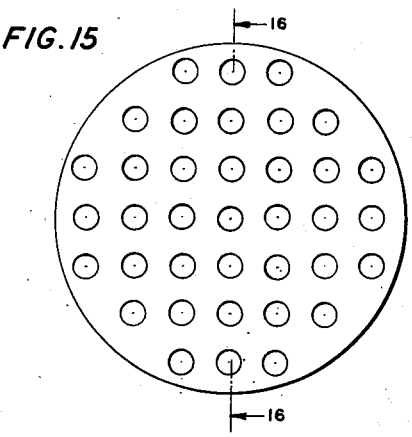
Fig. 15 is a plan view of a plate having circular holes.
Figure 16:
Fig. 16 is a cross-sectional view of the plate of Fig. 15.
Figure 17:
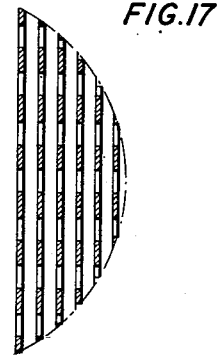
Fig. 17 is a sectional view of an array of plates according to Fig. 15, substantially filling a space in the form of a plano-convex lens.

Fig. 6 has shown the use of discs as the refractive elements. Since strips produce a similar disturbance upon acoustic waves, lenses can be made of arrays of strips as shown in Figs. 11 and 12. Here it is the strip width S in Fig. 12 which must be small relative to the wavelength to avoid resonance effects, just as, in the case of the discs, the size of the discs was to be small compared to the wavelength of the sound waves. It is also desirable that the strip spacing be small to secure efficient operation. If the strips run in both directions, or are interwoven, as shown in Fig. 13, a more highly refractive array is obtained and this can also be simulated by a flat sheet of metal having square holes cut in it as in Fig. 14. Finally if the holes of Fig. 14 are made circular, the round hole type of lens is obtained, a representative plate of which is shown in Fig. 15. Fig. 16 is a cross section of this plate and Fig. 17 shows a lens made of a series of such plates having holes cut in them.

Figure 18:
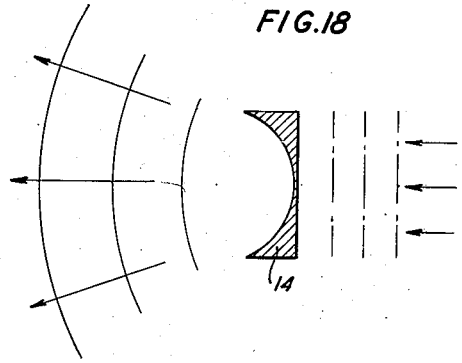
Fig. 18 is a diagram showing the effect of a plano-concave sound refractor in converting a plane wave into a diverging wave.

Convex lenses of a medium which delays the waves cause a converging of rays when plane waves strike them. If the lens is made concave, however, the rays will diverge as shown in Fig. 18, where the cross hatched area 14 represents the plano-concave contour of an acoustic lens. Plane waves arriving from the right diverge as they pass through the lens.

Figure 19:
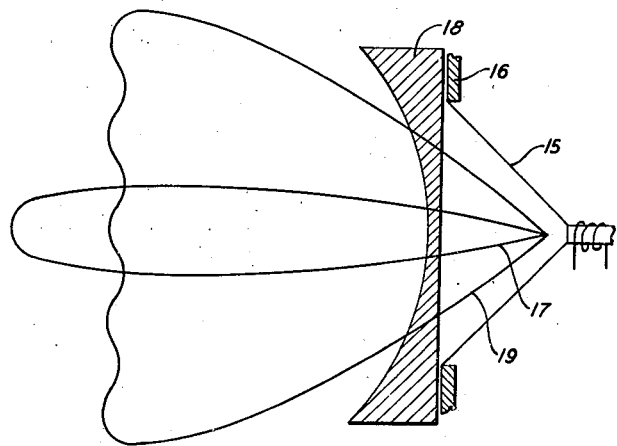
Fig. 19 is a diagram showing the combination of the plano-concave lens of Fig. 18, and a loudspeaker, together with a typical sound pattern for the combined arrangement and a typical sound pattern for the loudspeaker alone.

Use can be made of diverging lenses with loudspeakers to avoid the beaming of the high frequencies along the axis. The result is shown in Fig. 19. Here 15 is a loudspeaker cone operating as an acoustic piston in a baffle plate 16. Its directional pattern at high audio frequencies will be very sharp, that is, "beamed" along the axis as shown in the curve 17. This is because the cone, acting as a piston, produces approximately plane waves at the baffle opening and the rays are therefore traveling perpendicular to the baffle, i. e., along the axis. As shown in Fig. 18, however, a concave lens can cause the rays to diverge and the energy will spread out in a manner to be desired, for example as in curve 19.

Lenses such as the one of Fig. 6 achieve a focussing or energy concentrating effect because of their ability to intercept the larger amount of energy falling on their area relative to the energy falling on the smaller area horn 10 in Fig. 7. Because they present their area to the incoming wave they are called "broadside" receivers or radiators.

The effect of the decreased velocity of waves passing through the disc and strip arrays is equivalent to a longer path length of the waves in a free space medium such as unobstructed air.

The array may be considered as constituting an artificial medium for sound waves, the velocity of wave propagation through this medium being different from the velocity of wave propagation in a free space medium. Another kind of artificial medium for sound waves may be constructed of rigid, spaced, parallel plates set at an angle with respect to the direction of propagation of sound waves incident upon the medium. Such a medium will be called a "slant plate medium" and a lens composed of this medium will be called a "slant plate lens." A slant plate medium may be used to force sound waves to travel a longer path than they would in free space, and a slant plate lens may equalize the time of arrival of sound waves at a focus just as effectively as if the rays had passed through a lower velocity medium. The effective index of refraction of the slant plate medium is evidently $1/\cos\theta$, where $\theta$ is the angle of slant of the plates.

Figure 20:
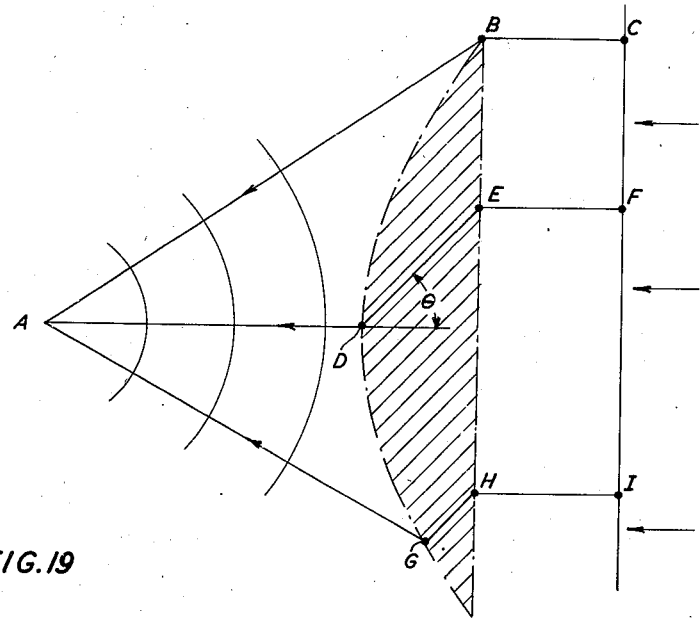
Fig. 20 is a diagram showing a cross-sectional view of a slant plate type of refractor to indicate equal path lengths whereby plane waves may be brought to a focus.

Fig. 20 is a diagrammatical representation of a cross section through a plano-convex slant plate lens, the section being the one passing through the central axis of the lens in a plane perpendicular to the slant plates. The angle $\theta$ is indicated. A number of paths are shown as rays, the ray FEDA being equal in length to the ray CBA which in turn is equal to IHGA. A plane wave arriving from the right converges upon the point A, as shown by the equi-phase plane CFI which becomes circular and convergent after passage through the lens, the center of curvature being the focal point A.

Figure 21:
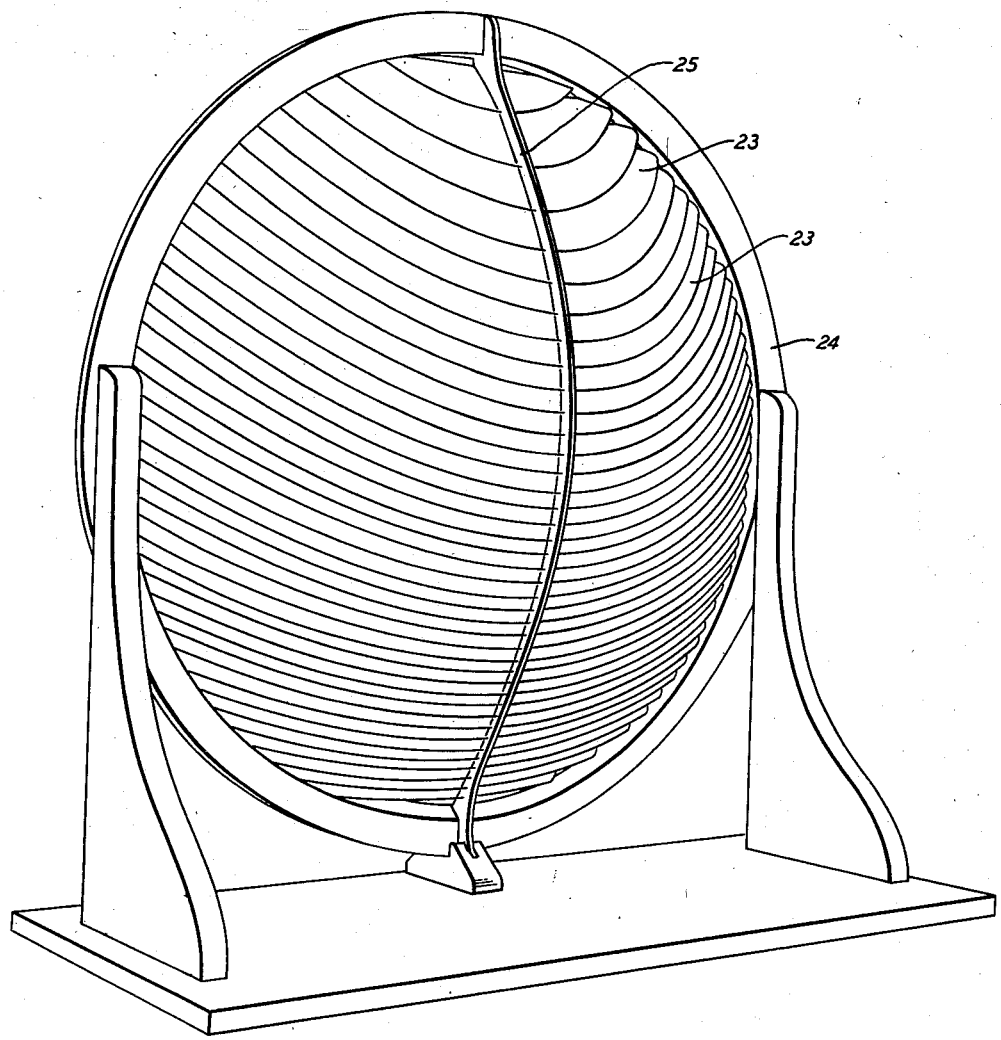
Fig. 21 is a perspective view of a convex refractor made up of inclined rigid plates mounted in a circular frame.
Figure 22:
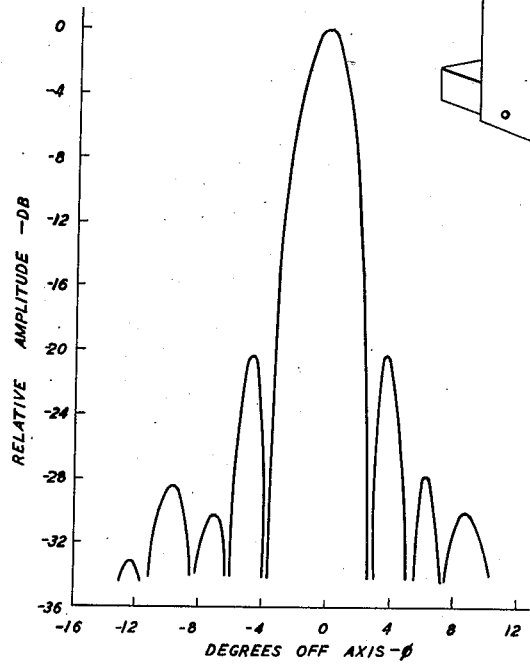
Fig. 22 is a directional radiation pattern of a refractor of the type shown in Fig. 21.

Fig. 21 is a perspective view of a 30 inch diameter lens of this type which was actually built and tested, its cross section being similar to that shown in Fig. 20. The slant plates 23 are set in a circular frame 24 with a curved brace 25. Fig. 22 is a radiation pattern of this lens taken at an acoustic frequency of 11,000 cycles per second using a 3 inch feed horn at the focal point. A strong concentration of energy is observed.

Figure 23:
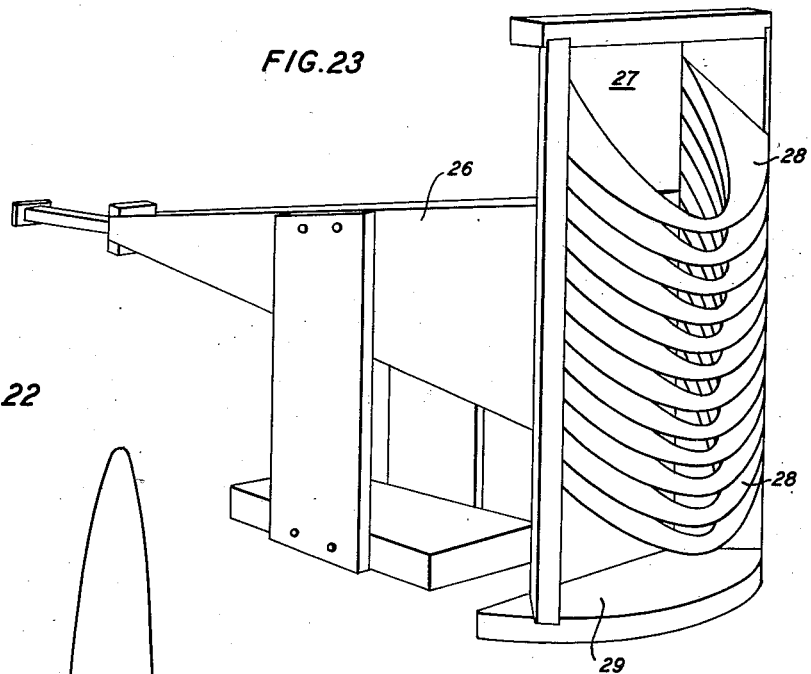
Fig. 23 is a perspective view of an acoustic horn with a cylindrical slant plate type of sound refractor mounted at the opening of the horn for dispersing sound waves in a diverging pattern from the mouth of the horn.
Figure 24:
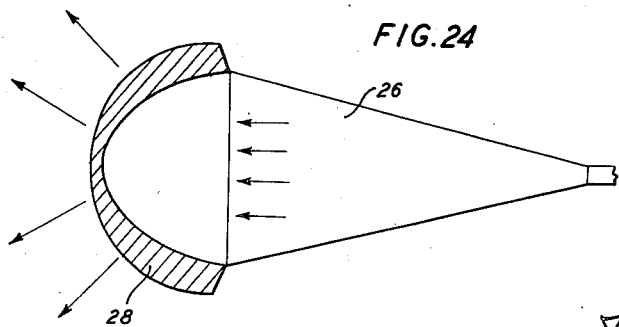
Fig. 24 is a plan view and diagrammatical representation of the horn and refractor of Fig. 23.

The "slant plate" refractive medium can also be used to produce diverging lenses as shown in Fig. 23 representing a long acoustic horn 26 of 6 inch aperture having a cylindrical diverging lens 27 before it. The lens is composed of slant plates 28 set in a rectangular frame 29. Because the horn is long, approximately plane waves emerge from the horn and they are caused to diverge as they leave the lens as shown in Fig. 24.

Arrays of spheres may also be used to refract sound waves in a manner similar to arrays of discs.

The calculation of the effective index of refraction of the various arrays can be made from the following theoretical considerations:

A sphere moving through a fluid acquires an increased inertia because it is continually displacing a certain mass of fluid. In Lamb's Hydrodynamics, p. 124 (Dover, 1945), this increment is shown to be equal to one-half the mass of the displaced fluid. (See also Rayleigh of Sound, vol. 11, page 248, Dover, 1945.) If, instead, the fluid is in motion and the sphere fixed, the fluid acquires an increased mass so that fluid moving past an array of spheres numbering $N$ per unit volume would appear to have its original density $\rho_0$ increased to the value $$\rho = \rho_0 + \frac{1}{2}N\rho_0 V$$

where $V$ is the volume of one sphere. That is, the inverse ratio of the effective density of the free medium to that of the sphere array is $$\frac{\rho}{\rho_0} = 1 + \frac{1}{2}N\frac{4\pi}{3}a^3$$

where $a$ is the radius of the sphere.

Now the velocity of propagation of sound in a medium is inversely proportioned to the square root of the density of the medium, so that the ratio of sound velocities is $$\frac{v_0}{v} = n = \sqrt{1 + \frac{2\pi}{3}Na^3}$$

where $n$ is the index of refraction.

For the case of discs, Rayleigh, loc. cit., p. 248 shows that here the mass increase per disc is $$\frac{2}{\pi}\rho_0\frac{4}{3}\pi r^3$$

where $r$ is the disc radius. This gives $$n = \sqrt{1 + \frac{8}{3}Nr^3}$$

for a disc array having $N$ discs per unit volume. For the case of strips, the following equation holds true:

$$n^2 = 1 + \pi b^2 N_1$$

(Lamb, p. 85 Eq. 11) where $b$ is the half breadth of the strip and $N_1$ is the number per unit area looking end on at the strips.

All of the above theoretical considerations are rigorously valid if the size and spacing of the obstacles is small compared to the wavelength. When the obstacle size nears a half wavelength, resonance effects can occur and the propagation velocity is strongly affected. Below resonance, the index of refraction increases rapidly, and at resonance, the array has infinite index of refraction, i. e., it reflects strongly. Above resonance, the phase velocity is higher than free space velocity. In this whole region of frequencies near resonance, dispersion occurs and prisms will bend different frequency sounds different amounts. This effect permits a complex tone comprising many frequencies to be analyzed, similarly to the splitting of white light of the sun into its component spectral frequencies (colors) by a dispersing glass optical prism.

When a sound refractor of the type comprising rigid spheres or the equivalent is subjected to sound waves of a frequency above the resonant frequency, the velocity $v_1$ in the array is greater than the free space velocity $v_0$ and hence, as above mentioned, the index of refraction for the array is greater than unity and the angle of refraction is greater than the angle of incidence, that is, the ray is bent away from the normal. When so operated, convex lenses become diverging lenses and concave lenses become converging lenses.

In any of the forms of the invention comprising arrays of rigid elements intended to impede the progress of an incident wave, it is advantageous to have the elements, such as discs, spheres, strips or perforated plates set with their active areas or faces perpendicular to the axis of the lens, prism or other refracting form which is to be made.

In the slant plate type of device it is advantageous to have the plates set with their longitudinal axes parallel to each other and perpendicular to the axis of the refractor.

In applications where it is desired to have a constant index of refraction over an extended frequency band it is advantageous to have the spacings between adjacent elements small compared to the wavelengths involved.

Earlier known forms of lenses for compressional and acoustic waves have been in the form of a bladder containing a gas, a steel lens immersed in water, etc., in which cases the particles of which the lens is composed move with the compressional wave or sound wave. The lenses herein disclosed are composed of rigid elements or particles which do not move with the wave.

The devices in accordance with the invention are capable of use with compressional waves of various modes, including longitudinal and transverse modes of vibration.

What is claimed is:

1. A compressional wave refractor comprising a plurality of rigid discs of equal diameter, relatively small with respect to a wavelength of a wave with which the device is intended to operate, an array of rigid rods mounted parallel to each other and spaced apart by at least one diameter of the said discs, said plurality of discs being mounted upon said rods and spaced apart along said rods by a distance which is small compared to the said wavelength.

2. A lens comprising a plurality of rigid rod members mounted parallel to each other, a plurality of rigid disc members mounted on the respective parallel rods, said discs being parallel to each other and uniformly spaced apart by an interval which is small compared with the operating wavelength, the rods upon which said discs are mounted also being uniformly spaced from each other in rows and columns by spacing intervals which are small compared with the wavelength, and said spaced discs substantially filling a volume of space having the shape of an optical lens.

3. A compressional wave refractor comprising a plurality of rigid discs each relatively small with respect to a wavelength of a wave with which the device is intended to operate, and an array of rigid rods spaced apart by approximately one diameter of a disc, said plurality of discs being mounted upon said rods and spaced apart along said rods by distances small compared to the said wavelength.

4. A compressional wave converging lens comprising a plurality of rigid discs each relatively small with respect to a wavelength of a wave to be converged, said discs being spaced apart by distances each relatively small with respect to the said wavelength and confined to and substantially uniformly distributed throughout a volume of space bounded by two convex surfaces, said discs being supported by a framework of rigid rods.

5. A double convex lens comprising a plurality of rigid rod members mounted parallel to each other, a plurality of rigid disc members mounted on the said rod members, said disc members being arranged parallel to one another and uniformly spaced apart by an interval which is small compared with the operating wavelength, the rod members being uniformly spaced from one another in rows and columns at intervals that are small compared with the wavelength, said disc members being confined to and substantially uniformly distributed throughout a double convex volume of space, the axis of which is parallel to the said rod members.

6. An artificial delay structure for compressional waves that are incident upon a given area and that are to be propagated through a given extended region subtended by said area, said region being relatively permeable to the compressional waves, said structure comprising a substantially regular open-work array of individual localized substantially point sources of secondary compressional waves, said point sources being of macroscopic substantially uniform shape and size but small compared to a half wavelength of the waves to be delayed and several times smaller than the average thickness of the array in the direction of propagation of the waves therethrough, said array being composed of a material that is relatively rigid compared to said permeable medium, said array being rigidly mounted within and substantially filling said extended region while permitting the passage of the waves through and beyond the region, the individual point sources being spaced in three dimensions at distances that are macroscopic but small compared to the said half wavelength and to the said average thickness of the array, and the actual thickness of the array in the direction of propagation of the waves therethrough varying over the said subtending area.

7. A structure according to claim 6 in which the array comprises a plurality of discs.

8. A structure in accordance with claim 6 in which the array comprises a plurality of perforated plates.

References Cited in the file of this patent

UNITED STATES PATENTS

| Number | Name | Date |
|---|---|---|
| 728,105 | Hipple et al. | May 12, 1903 |
| 912,735 | Rose | Feb. 16, 1907 |
| 920,387 | Petri-Palmedo | May 4, 1909 |
| 1,355,598 | Fessenden | Oct. 12, 1920 |
| 1,895,442 | Bowker | Jan. 31, 1933 |
| 1,914,072 | Boylston | June 13, 1933 |
| 2,000,806 | White | May 7, 1935 |
| 2,033,337 | Harmer | Mar. 10, 1936 |
| 2,214,393 | Wilbur | Sept. 10, 1940 |
| 2,408,436 | Mason | Oct. 1, 1946 |
| 2,423,459 | Mason | July 8, 1947 |
| 2,455,389 | Soller | Dec. 7, 1948 |
| 2,459,162 | Hayes | Jan. 18, 1949 |

FOREIGN PATENTS

| Number | Country | Date |
|---|---|---|
| 650,313 | France | Sept. 18, 1928 |
| 337,900 | Great Britain | Nov. 13, 1930 |
| 373,380 | Great Britain | May 26, 1932 |
| 791,142 | France | Dec. 4, 1935 |
| 353,669 | Italy | Ril. Oct. 25, 1937 |
| 839,805 | France | Jan. 7, 1939 |

OTHER REFERENCES

"Metal Lens Antennas", Kock, Proceedings of the I. R. E. vol. 34, pp. 828–836, Nov. 1946.

"A Metal Lens" Radio-Craft Magazine, June 1946, pp. 602–651.

Bell Telephone System Technical Publications Monograph B-1565—"Microwave Repeater Search"—1948 pp. 19–28 Section III (Note figure on page 26). (This article published in Bell System Technical Journal vol. 27, pp. 183–246, April 1948).

Publication: "Acoustical Engineering" by Olson, pages 19, 20, 21 and 33 through 39, 2nd edition 1947; Van Nostrand Inc., N. Y. (copy in Patent Office Library TK; 5891; .05).